INVENTORS
WILLIS DE BOER,
& JOSEPH F. CONTE
BY
RICHEY, WATTS, EDGERTON,
McNENNY & FARRINGTON
ATTORNEYS

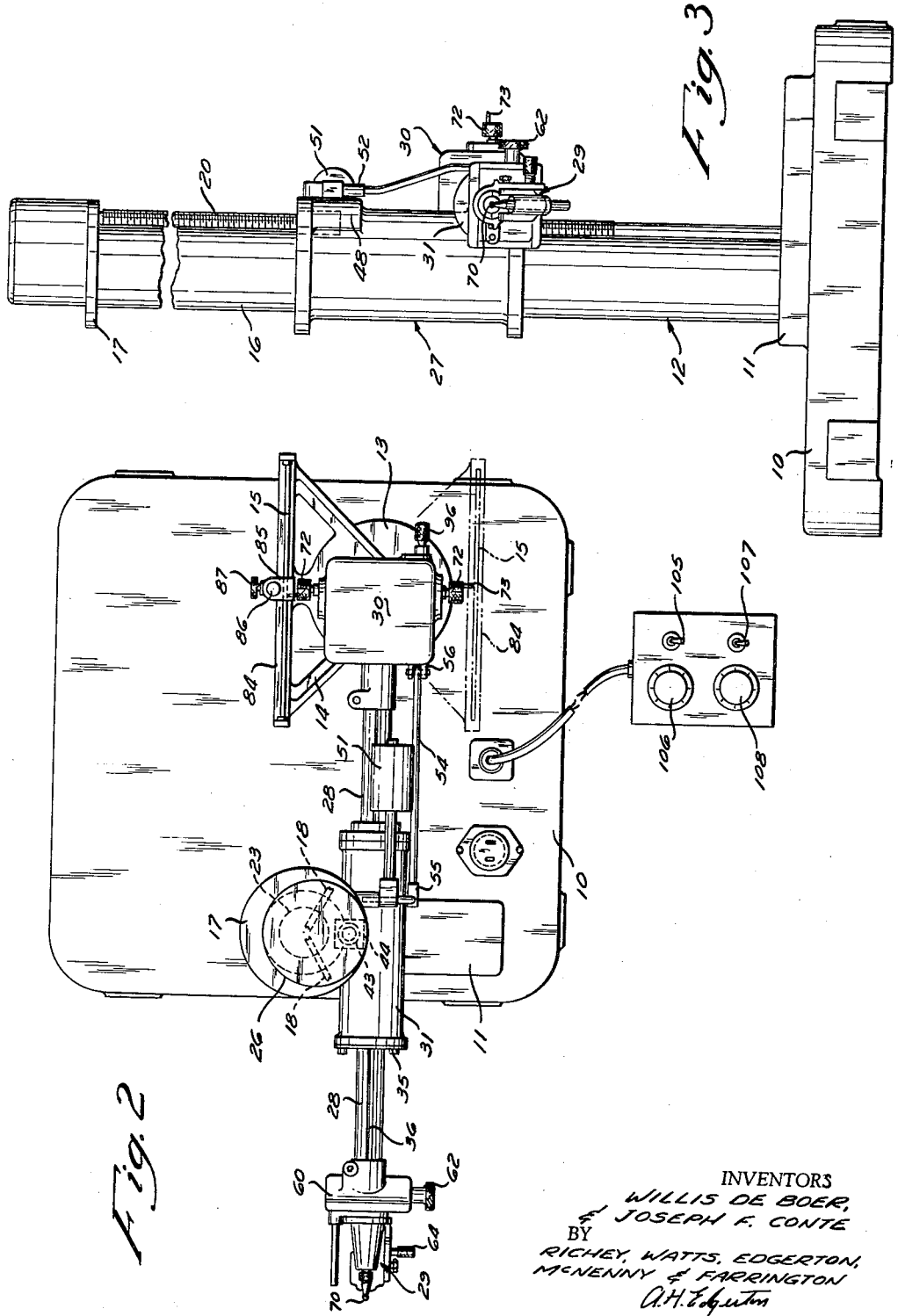

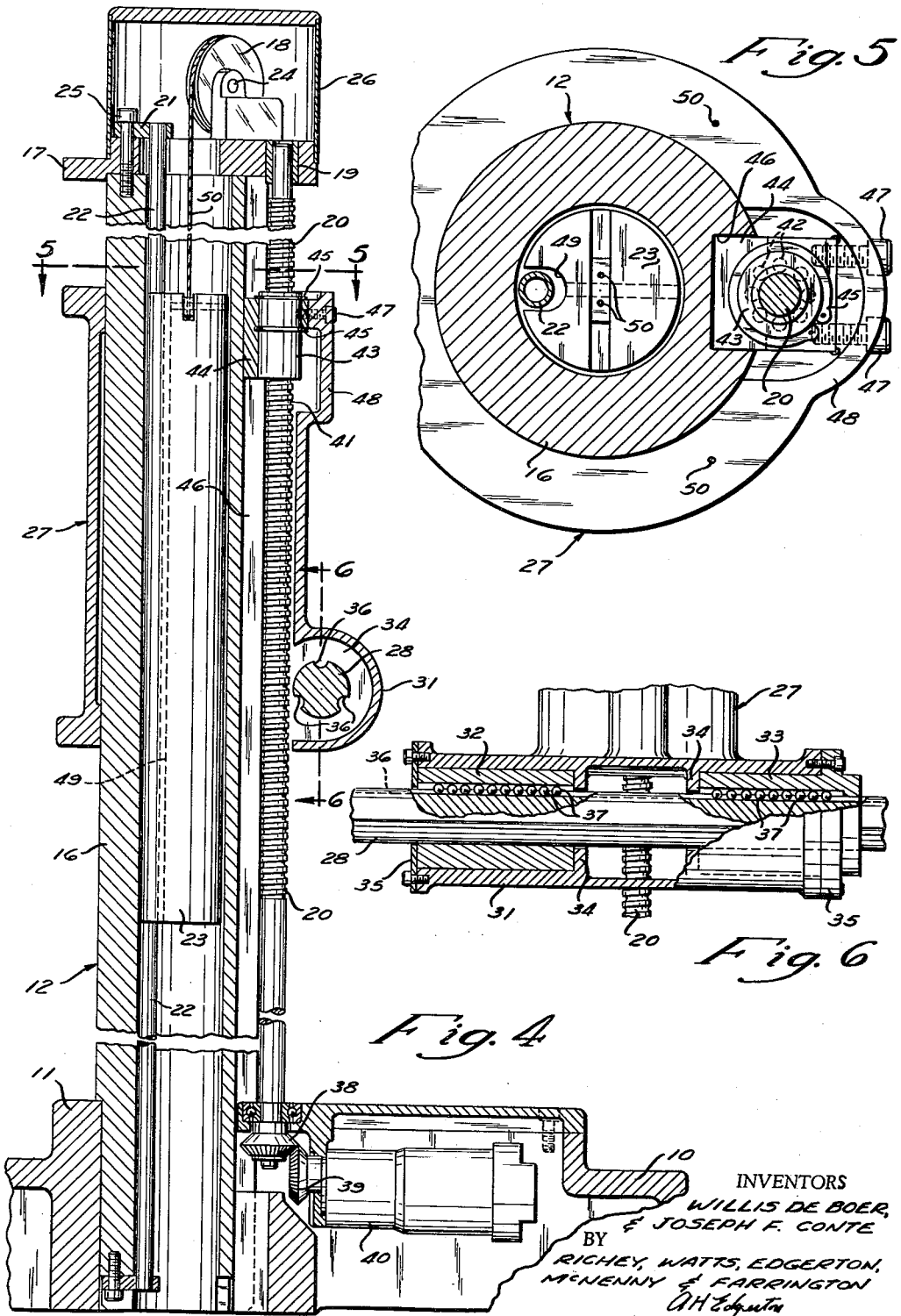

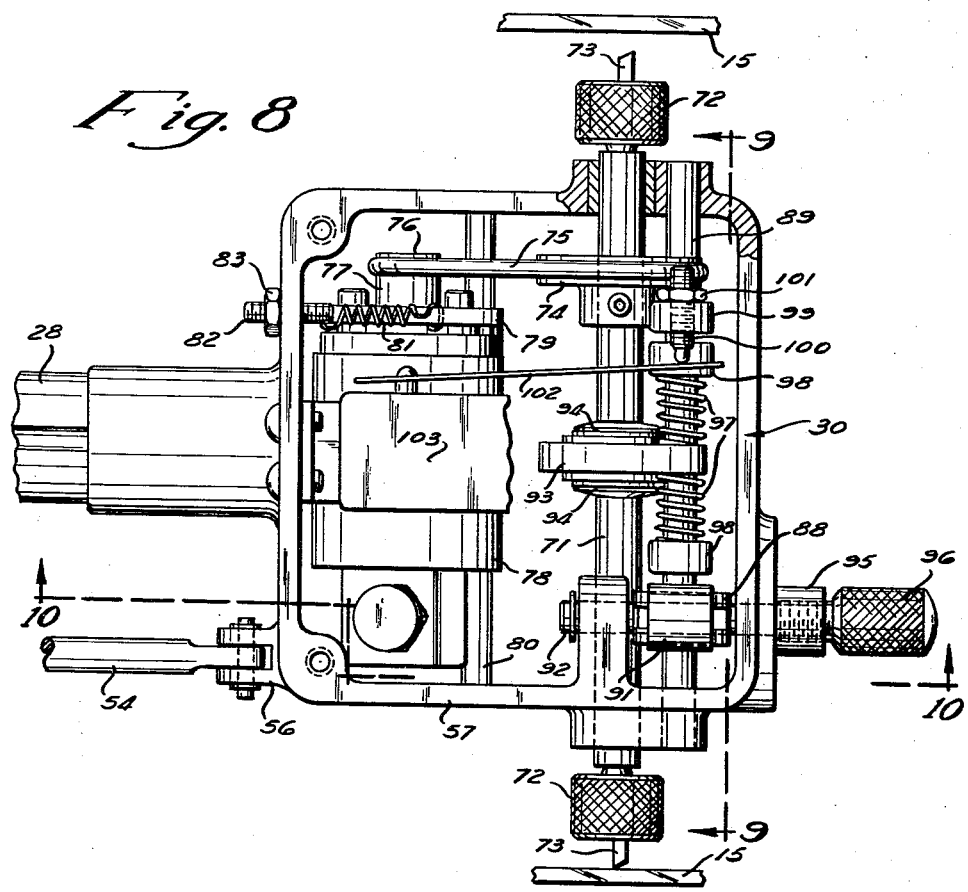
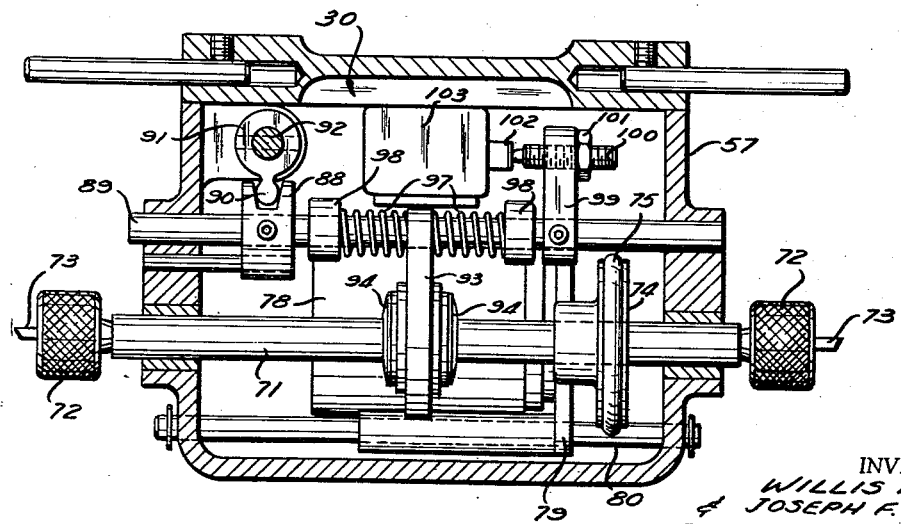

United States Patent Office 3,055,114
Patented Sept. 25, 1962

3,055,114
CONTOUR SCRIBER
Willis De Boer and Joseph F. Conte, Rochester, N.Y., assignors to Optical Gaging Products Inc., Rochester, N.Y., a corporation of New York
Filed July 25, 1958, Ser. No. 750,924
6 Claims. (Cl. 33—23)

This invention relates to portable gauging instruments for accurate graphic reproductions of the contour of irregular bodies, such as the profiles of punch and die sets, or the lineation of a mock-up when multiple parts are made therefrom.

One of the objects of the invention is to provide a vertical panel (preferably formed of glass with an opaque coating thereon), a cutting tool engaged therewith for the removal of the coating, and a probe arranged to engage the work-piece and guide the movement of the cutter over the panel.

The invention further contemplates the structure of a probe supporting mechanism, a unique arrangement of the panel frame, the organization of the power driving units for the cutter heads, an elevating mechanism for the cutter supporting head, and certain improvements in the base and frame of the machine.

Another object of the invention is to provide graphic records for comparison of right and left-hand dies, molds, templates, patterns, models and parts.

A further object of the invention is to provide a traced record to check the wear in die sets or molds.

Another object of the invention is to provide a tracing of the shape of an article and the relationship of the contour thereof to a base line, center of gravity or stacking center line.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

FIG. 2 is a plan view thereof;

FIG. 3 is a side elevational view of the machine;

FIG. 4 is a vertical sectional view of the stanchion illustrated in FIG. 1, the section being taken on a plane indicated by the line 4—4 in FIG 1;

FIG. 5 is a transverse sectional view taken on a plane indicated by the line 5—5 in FIG. 4;

FIG. 6 is a vertical sectional view through a cutter supporting sleeve mounted on a stanchion in the machine, the section being taken on a plane indicated by the line 6—6 in FIG. 4;

FIG. 8 is a plan view partially in section of the cutter power drive housing, the cover plate therefor being removed in this view, in the interest of clarity;

FIG. 9 is a vertical sectional view through the cutter power drive housing, the section being taken on a plane indicated by the line 9—9 in FIG. 8.

Figure 1:
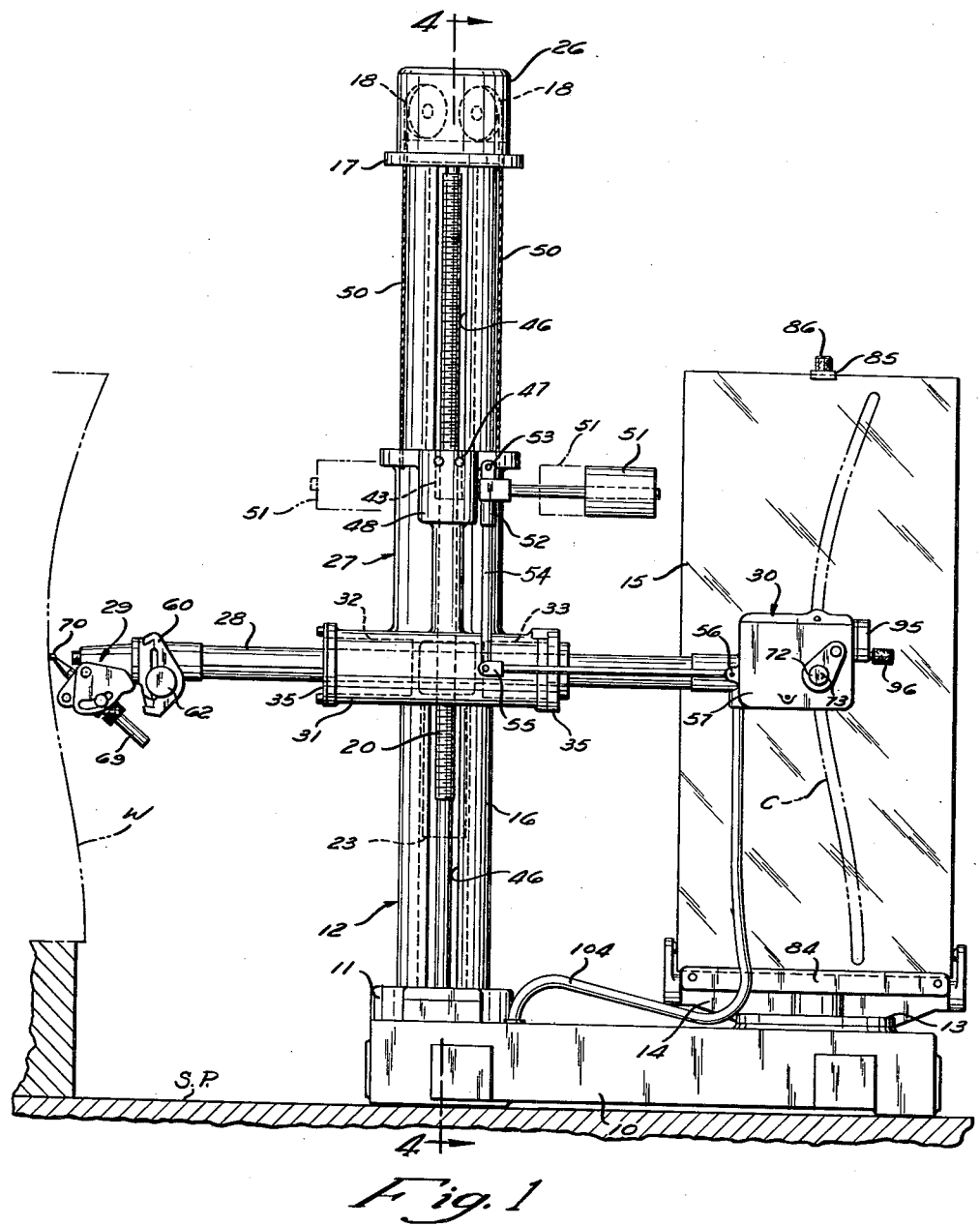
FIG. 1 is a front elevational view of the optical contour tracing machine.
Figure 7:
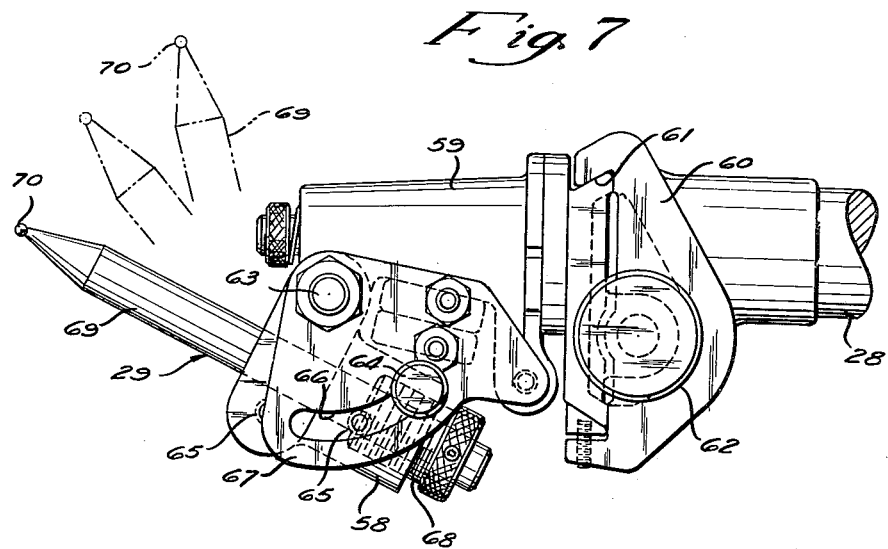
FIG. 7 is a side elevational view of the probe carrier.
Figure 10:
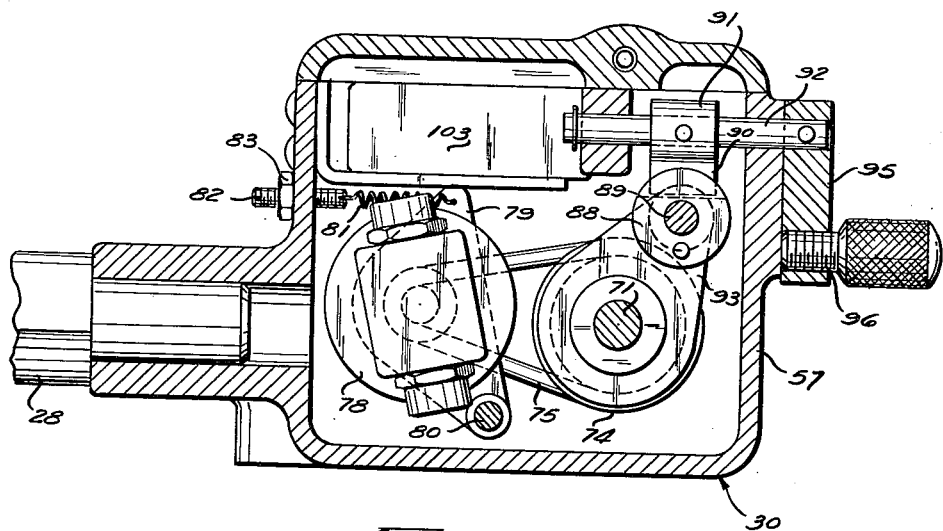
FIG. 10 is a vertical sectional view through the cutter power drive housing, the section being taken on a plane indicated by the line 10—10 in FIG. 8.

Referring first to FIG. 1, the machine comprises a base 10 having the lower face thereof machined for engagement with a surface plate, S.P., a boss 11 on the upper face thereof which is bored to receive a stanchion or post 12 and a second boss 13 on the upper face of the base to support a frame 14 for the panel 15 upon which the contour of the work is inscribed. A work-piece W is supported on the surface plate near base 10.

The post 12 embodies a cylindrical tube 16 turned adjacent the lower end thereof for snug engagement in the bore in the boss 11, and having its upper end faced to receive a cap 17 that supports a pair of sheave wheels 18, a bushing 19 for an elevating screw 20, and a bracket 21 for the retention of a guide rod 22 to assure vertical reciprocative movement of a counterweight 23. The lower face of the cap 17 is recessed for telescopic engagement with the tube 12 and the upper side thereof is provided with blocks having ears thereon which are drilled to retain pins 24 constituting axles for the sheave wheels 18. The cap is retained in place by cap screws 25 threaded in tapped openings in the end of the tube, certain of the screws retaining the bracket 21 for the counter-weight guide rod 22. The upper face of the cap is shouldered to support an inverted cup 26 that envelops the sheave wheels and closes the top of the tube.

The circumferential face of the tube is accurately machined throughout its length and a sleeve 27 that supports a cross bar 28 for a probe 29 and a cutter power drive mechanism 30 is telescopically and snugly engaged therewith. The lower end of the sleeve is formed with a cylindrical horizontal boss 31 which is bored for sliding engagement of the cross bar 28. The boss 31 retains a pair of bushings 32 and 33 in the ends thereof which are retained against axial movement by shoulders 34 within the bore adjacent the center thereof and end plates 35. The bushings 32 and 33 and the cross bar 28 are machined with mating key ways 36 for balls 37 which minimize lateral deflection of the bar and reduces frictional resistance thereof as the bar is reciprocated in the bushings.

The sleeve is elevated, and/or lowered, by the screw 20 which has a beveled gear 38 on the lower end thereof entrained with a beveled pinion 39 mounted on a reversible electric motor 40 supported in a cavity in the base 10. The screw is formed with a helical groove 41 having a semi-circular thread foot and hardened balls 42 mounted in a cage 43 supported in the upper end of the sleeve and engaged with the thread to facilitate translation of the sleeve as the screw is rotated by the motor. The cage 43 is seated in a rectangular block 44 and retained therein by snap rings 45. The block is mounted in a lineal groove 46 of rectangular cross section in the tube 16 and retained in the sleeve 27 by cap screws 47 mounted in an arcuate web 48 in the top of the sleeve casting. The screw 20 and the ball bearing runner block or cage 43 are of a well-known commercial form, hence, a further description thereof is deemed unnecessary herein.

The weight of the sleeve 27 and associated parts is counter-balanced by the weight 23 which is of cylindrical form and mounted for free vertical movement within the bore in the tube 16. The face of the weight is formed with a lineal groove 49 therein which loosely engages the rod 22 and restrains excessive side sway thereof as the sleeve is reciprocated. The weight is supported by cables 50 roved over the sheave wheels 18 and anchored at their opposed ends to the sleeve and to the top of the weight.

The thrust imposed upon the probe 29, as it follows the curvilinear form of a workpiece W (FIG. 1), is minimized by the anti-friction bearing afforded by the balls 37, but the probe is urged under uniform pressure against the face of the workpiece by a counter-weight 51 supported by a bell crank 52 fulcrumed on a pin 53 mounted in the top of the sleeve. The lower arm 54 of the bell crank is pivotally connected to a link 55 which in turn is pivoted to a boss 56 on the inner face of the housing 57 for the cutter drive mechanism 30. Thus as the effort of gravity upon the weight 51 rotates the bell crank clockwise, the line 53 will pull the housing 57 and associated parts inwardly and move the cross bar 28 and probe 29 against the workpiece W.

The probe 29 is mounted on a holder 58 supported by a slide 59 in a bracket 60 on the end of the bar 28. The bracket 60 is formed with a dovetail groove 61 therein for horizontal adjustment of the slide 59 and is actuated by a thumb screw 62. The probe holder 58 is pivotally mounted on the slide by a pin 63 and is held in a fixed position by a screw 64 mounted in one of a plurality of tapped holes 65 in a bar holder 58 on the slide 59. The holder is retained in its adjusted position by engagement of the head of the screw 64 in an arcuate slot 66 in the flange plate 67. The probe is locked axially by a collet 68 engaged with the shank of the probe and screw threaded in the holder body. The shank 69 of the probe is formed with a conical end portion having a spherical tip or ball 70 on the end thereof.

The housing 57 for the cutter power drive mechanism 30 is provided with a spindle 71 which protrudes beyond the ends of the housing and is provided at each end thereof with chucks 72 for the retention of fly cutters 73. Each fly cutter is mounted in eccentric relation to the center of rotation of the spindle 57 and describes a circular path which is complemental to the diameter of the probe ball tip 70. The circular cuts of the fly tools are merged, during the translation of the cutter, to form a continuous elongated image C (FIG. 1). As the cutter revolves, it removes the coating from the glass panel and traces a faithful reproduction of the portion of the work engaged by the probe ball tip 70.

The spindle 71 is provided with a pulley 74 which carries a belt 75 entrained with a second pulley 76 on the armature shaft 77 of a fractional horsepower electric motor 78 in the housing 57. The motor is mounted on a plate 79 pivoted in one corner thereon on a pin 80 and urged outwardly by a spring 81 to maintain the belt 75 under tension. One end of the spring is retained by the plate and the other end is secured to a screw 82 threaded in the housing and locked in adjusted position by a jamb nut 83. The panel 15 is mounted in a frame 14 pivoted on the base for rotative adjustment through 180°, as shown by the dot-dash lines in FIG. 2 so the plate may be positioned to receive the image of mating dies when necessary or desirable. The frame comprises a channel 84 at the base thereof formed to receive the coated glass plate and is provided with a clamping lug 85 in the end of a rod 86 that retains the upper end thereof. The clamping lug is actuated by a thumb screw 87 for the retention of the plate. The spindle 71 is movable laterally so the fly cutter 73 in either end of the spindle may be brought into contact with the face of the plate 15. The spindle shifting mechanism comprises a yoke 88 affixed to a rod 89 journaled in the housing 57 superjacent and parallel to spindle 71. The yoke is engaged by a tongue 90 on a collar 91 keyed to a bar 92 transaxial and above the rod 89. The rod 89 has an arm 93 secured thereon, the outer end thereof being straddled by collars 94 locked to the spindle 71. The outer end of the bar 92 protrudes beyond the housing and is provided with a crank arm 95 keyed thereto and locked in its adjusted position by a screw 96 extended through the arm for impinged relation with the outer wall of the housing 57. The rod 89 is provided with helical springs 97 that surround the rod and abut respectively the side wall of the arm 93 and the inner faces of collars 98. The function of the springs is to provide a light tension of the fly cutter 73 on the coated glass plate 15. An arm 99 is locked to the rod 89, the upper end thereof having a set screw 100 then which is secured in its adjusted position by a jamb nut 101. The end of the screw, when brought into abutting engagement with a leaf spring 102 on a switch 103, rocks the stem thereof and breaks the electric circuit to the motor 78, thus reversing the rotative movement of the cutters.

The motor 78 is energized by electric current carried by wires in a cable 104 attached to a junction box in the base of the machine and controlled by an electric switch 105 remote from the base 10. The switch 105 is provided with a rheostat 106 to vary the speed of the cutters.

In operation, the workpiece W is placed on a surface plate S.P. or similar flat smooth surface with the face to be duplicated in an accessible position for the engagement with the probe of the machine. The machine is next positioned on the surface plate adjacent to the workpiece and the probe is adjusted into contact with the contiguous face thereof, preferably at the base of the curved or inclined surface to be copied. The motor 40 is then operated to effect the elevation or descent of the sleeve 27 by switch 107 with speed control rheostat 108. The bar 28 moves horizontally during the vertical movement of the probe as it follows the contour of the work. As the sleeve ascends, the motor 78 is energized to effect the rotation of the cutters 73 which removes the emulsion from the glass plate or panel 15 engaged therewith. The tracing thus produced will be a faithful duplication of the configuration of the portion of the workpiece, and may be used on a comparator to verify the contour thereof.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A machine for tracing the contour of a workpiece onto a panel comprising:
   (a) a base,
   (b) a panel supported by said base,
   (c) a vertical post extending upwardly from said base adjacent to said panel, a sleeve having close sliding engagement on said post and means including a reversible motor in said base for moving said sleeve vertically on said post,
   (d) a horizontal bar carried by said sleeve, a probe on one end of said bar to engage a workpiece positioned adjacent to said post, a cutter drive mechanism on the opposed end of said bar and including a fly cutter engageable with said panel and means to rotate said fly cutter,
   (e) and means for maintaining said probe against the surface of the workpiece during vertical movement of said sleeve, said means including a bell crank pivoted to said sleeve and having a horizontal arm extending away from said workpiece, and a downwardly extending vertical arm, a link connecting the vertical arm to the cutter drive mechanism, and a counterweight on the horizontal arm serving to urge the bar horizontally toward the workpiece.

2. The combination of elements set forth in claim 1 in which the means for moving the sleeve on the post includes a threaded shaft disposed adjacent and parallel to said post having threaded engagement with said sleeve and being journaled in the base, and gear means driven by the motor for rotating the shaft.

3. The combination of elements set forth in claim 1 in which a counter weight is slidably disposed within the post and a cable attached at one end to the upper end of said counter weight extends over a sheave wheel supported by the post and at its other end is connected to the sleeve, said counter weight serving to balance the sleeve and minimize back lash in the gears between the motor and shaft.

4. The combination of elements set forth in claim 1 in which the means for supporting the panel on the base includes a frame mounted for rotative adjustment on the base and including channel means shaped to receive a panel and means for clamping the panel on the frame.

5. The combination of elements set forth in claim 1 in which means is provided to prevent excessive rotation of said bar during endwise reciprocation, said means including opposed grooves in the bar and crosshead and balls in said grooves.

6. The combination of elements set forth in claim 1 in which the power means for rotating the fly cutter is mounted in a housing attached to the bar.

References Cited in the file of this patent

UNITED STATES PATENTS

| | | |
|---|---|---|
| 1,904,623 | Malcolm et al. | Apr. 18, 1933 |
| 2,789,354 | Polidor et al. | Apr. 23, 1957 |
| 2,832,239 | Bert et al. | Apr. 29, 1958 |